United States Patent [19]

Saito et al.

[11] Patent Number: 5,617,183
[45] Date of Patent: Apr. 1, 1997

[54] PHOTOMETRIC SYSTEM STRUCTURE

[75] Inventors: Kimitoshi Saito, Saitama-ken; Takashi Yamamoto, Kanagawa, both of Japan

[73] Assignee: Fuji Photo Film Co., Ltd., Kanagawa, Japan

[21] Appl. No.: 513,178

[22] Filed: Aug. 9, 1995

[30] Foreign Application Priority Data

Sep. 7, 1994 [JP] Japan .................................. 6-214107

[51] Int. Cl.$^6$ ........................... G03B 27/72; G03B 27/74; G03B 27/16; G03B 27/70
[52] U.S. Cl. ................... 355/71; 355/40; 355/45; 355/66; 355/67
[58] Field of Search ..................... 356/399–401, 356/389, 128, 131, 136, 137; 355/45, 46, 43, 67, 53, 77, 50, 70, 40, 71, 56, 66

[56] References Cited

U.S. PATENT DOCUMENTS

| | | | |
|---|---|---|---|
| 3,574,459 | 5/1971 | Hartwig et al. | 355/11 |
| 3,636,552 | 1/1972 | Orima | 340/324 |
| 3,649,119 | 3/1972 | Rempala et al. | 355/45 |
| 3,689,149 | 9/1972 | Livingood | 355/46 |
| 3,802,773 | 5/1974 | Schneider | 355/43 |
| 4,592,649 | 6/1986 | Freitag et al. | 355/43 |
| 4,618,239 | 10/1986 | Sakamoto | 354/477 |
| 4,791,456 | 12/1988 | Hope et al. | 355/28 |
| 4,959,683 | 9/1990 | Otake et al. | 355/28 |
| 5,016,044 | 5/1991 | Tokuda | 355/43 |
| 5,286,963 | 2/1994 | Torigoe | 250/201.2 |
| 5,432,606 | 7/1995 | Noguchi et al. | 356/360 |
| 5,486,895 | 1/1996 | Leidig et al. | 355/50 |

*Primary Examiner*—Arthur T. Grimley
*Assistant Examiner*—Herbert Kerner
*Attorney, Agent, or Firm*—Sughrue, Mion, Zinn, Macpeak & Seas

[57] ABSTRACT

A photometric system structure used in a printer section in which an image of a photographic film is printed onto a photosensitive material through a lens system. The lens system can be removed from an optical axis of light emitted from a light source and replaced by another lens system. A photometric device is disposed on the optical axis of the light emitted from the light source and changes an optical axis direction of at least a part of the light emitted from the light source to measure the light whose optical axis direction has been changed and which is used as photometric light. A beam splitter moves integrally with each of the lens systems. An optical-path correction lens is disposed on the optical axis of photometric light whose optical axis direction has been changed, and is provided such that a positional relationship between the beam splitter and the optical-path correction lens is fixed, so as to correct and adjust, to a predetermined length, an optical-path length between the light source and a position where the photometric light is measured.

23 Claims, 11 Drawing Sheets

PHOTOMETRIC SYSTEM STRUCTURE

BACKGROUND OF THE INVENTION

1. Field of the Invention

The present invention relates to a photometric system structure which is used in a printer section of a printer processor and which enables a prism and a mirror both to be used to obtain photometric light from light passing through a photographic film to measure the density of the photographic film or the like.

2. Description of the Related Art

In a printer section of a printer processor, light emitted from a light source passes through a negative film, and an image on the negative film is printed onto a photographic printing paper through a lens system.

Here, density correction and color compensation are effected in order to select a printing condition, photometric light is obtained from the light passing through the negative film and the obtained photometric light is received by a sensor such as a CCD.

Thus, when the negative film is a 35 mm film, a prism is disposed between a lens system on an optical path and the negative film. The prism is used to allow a part of the light passing through the negative film to be made incident on the lens system and also allow the remaining part of the light to be irradiated to the sensor as the photometric light.

On the other hand, when the negative film is a Brownie film or the like, a lens system corresponding thereto is used in place of the above-described lens system. Since the lens system corresponding to a Brownie film is of a large size, a mirror, not a prism, is used to obtain photometric light. Before the lens system is mounted, the mirror is positioned between the negative film and the photographic printing paper and causes the light passing through the negative film to be reflected, as the photometric light, toward the above-described sensor. After a printing condition is selected by the sensor which detects the light, the mirror is withdrawn from the optical axis, and thereafter, the lens system is mounted and an image is printed onto the photographic printing paper.

Although the optical axis of the photometric light obtained by the prism and the optical axis of the photometric light obtained by the mirror are disposed in the same direction, the prism and the mirror have different optical-path lengths. A correction lens is required to correct the different optical-path lengths.

The correction lens is conventionally provided between the sensor and the prism or the mirror and is moved and adjusted on the optical path such that the same optical-path lengths are obtained when the prism is used and when the mirror is used. Further, when the prism is used, the correction lens is mounted between the sensor and the prism, and when the mirror is used, the correction lens is removed from its mounted position. Thus, the same optical-path length is obtained when the prism is used and when the mirror is used.

Each time the lens system for the prism and the lens system for the mirror are replaced by the other, it is necessary to separately adjust and move the correction lens, or to mount or remove the correction lens between the sensor and the above-described optical system, thereby resulting in complicated operation.

SUMMARY OF THE INVENTION

In view of the above-described circumstances, it is an object of the present invention to provide a photometric system structure in which it is not necessary to mount and remove a correction lens nor to move and adjust the correction lens.

In accordance with a first aspect of the present invention, there is provided a photometric system structure used in a printer section in which an image of a photographic film is printed onto a photosensitive material through a lens system, the printer section having a structure in which the lens system can be removed from an optical axis of light emitted from a light source and can be replaced by another lens system, comprising: a photometric device disposed on the optical axis of the light emitted from the light source so as to correspond to each of the lens systems and changing a direction of an optical axis of a part of the light emitted from the light source to measure the light whose optical axis direction has been changed and which is used as photometric light, the photometric device having a beam splitter which moves integrally with each of the lens systems; and an optical-path correction lens disposed on the optical axis of photometric light whose optical axis direction has been changed and provided such that a positional relationship between the beam splitter and the optical-path correction lens is fixed, the optical-path correction lens adjusting and correcting, to a predetermined length, an optical-path length between the light source and a position at which the photometric light is measured.

In accordance with a second aspect of the present invention, there is provided a photometric system structure used in a printer section in which an image of a photographic film is printed onto a photosensitive material through a lens system which is one of a first lens system and a second lens system, the printer section having a structure in which the lens system can be removed from an optical axis of light emitted from a light source and can be replaced by a first lens system and a second lens system, comprising: a prism which, when the first lens system is used, is provided to move integrally with the first lens system and is positioned on the optical axis of the light emitted from the light source to change a direction of an optical axis of at least a part of the light emitted from the light source; an optical-path correction lens which, when the first lens system is used, is disposed on the optical axis of photometric light whose optical axis direction has been changed and is provided such that a positional relationship between the prism and the optical-path correction lens is fixed, the optical-path correction lens adjusting and correcting, to a predetermined length, an optical-path length between the light source and a position where the photometric light is measured; a mirror which, when the second lens system is used, is disposed on the optical axis of the light emitted from the light source and between the photosensitive material and the photographic film, the mirror reflecting light transmitted through the photographic film to change an optical axis direction of the light; and a light-receiving device provided on an optical axis of the light whose optical axis direction has been changed and receiving the photometric light.

In accordance with a third aspect of the present invention, there is provided a photometric system structure used in a printer section in which an image of a photographic film is printed onto a photosensitive material through first lens system or a second lens system, the printer section having a structure in which the lens systems can be removed from an optical axis of light emitted from a light source and can be replaced by one another, comprising: a prism which, when the first lens system is used, is provided to move integrally with the first lens system and is positioned on the optical axis of the light emitted from the light source to change a direction of an optical axis of at least a part of the light emitted from the light source; an optical-path correction lens which, when the first lens system is used, is disposed on the optical axis of photometric light whose optical axis direction has been changed and is provided such that a positional relationship between the prism and the optical-path correction lens is fixed, the optical-path correction lens adjusting and correcting, to a predetermined length, an optical-path length between the light source and a position where the photometric light is measured; a mirror which, when the second lens system is used, is disposed on the optical axis of the light emitted from the light source and between the photosensitive material and the photographic film, the mirror reflecting light transmitted through the photographic film to change an optical axis direction of the light; and a light-receiving device provided on an optical axis of the light whose optical axis direction has been changed and receiving the photometric light, the light-receiving device comprising a CCD.

With the photometric system structure in accordance with the first aspect of the present invention, the image of the photographic film is printed onto the photosensitive material through the lens system. When the photographic film is a 35 mm film or the like, the beam splitter provided integrally with the lens system corresponding to a 35 mm film causes light passing through the photographic film to be transmitted and illuminated to the lens system, and changes the direction of the optical axis of a part of the light and measures the light whose optical axis direction has been changed as photometric light.

The density or the like of the photographic film is measured on the basis of the photometric light measured by the photometric device, and a printing condition can be selected by effecting density correction and color compensation. After selection of the printing condition, the image of the photographic film is printed onto the photosensitive material.

On the other hand, when another lens system is used, the mirror reflects exposure light passing through the photographic film toward the light-receiving device (specifically, a CCD), for example, as described in the second and third aspects of the present invention.

The light-receiving device receives photometric light in a manner similar to the case where the beam splitter (specifically, a prism) is used. On the basis of the received photometric light, the printing condition can be selected. Thereafter, the mirror is withdrawn from the optical axis of exposure light and a lens system corresponding to a Brownie film is mounted on the optical axis.

The optical axis of photometric light changed by the prism and the optical axis of photometric light changed by the mirror are disposed in the same direction. However, the optical-path length when the prism is used and the optical-path length when the mirror is used are different. Accordingly, the optical-path length of the photometric light obtained by the mirror is set and adjusted to the optical-path length corresponding to a position where the light-receiving device is disposed. When the prism is used, the optical-path length of the photometric light obtained by the prism is corrected by the correction lens to be adjusted to the optical-path length obtained when the mirror is used.

Since the correction lens is provided integrally with the beam splitter (specifically, a prism) and can be mounted and removed together with the lens system, it is not necessary to mount and remove the correction lens separately from the lens system nor is it necessary to move and adjust the correction lens.

The other lens system which replaces the lens system is not limited to a case in which a mirror is used to obtain photometric light and a lens system using a prism may also be used. When these lens systems have different optical-path lengths resulting from different prisms being used, a correction lens is provided in each of the lens systems so that the optical-path length of each of the lens systems can be adjusted to an optical-path length which corresponds to a position where the light-receiving device is disposed. Further, the optical-path length of photometric light obtained by a prism of one of the lens systems is set as the optical-path length which corresponds to a position where the light-receiving device is disposed, and a correction lens is provided in the other of the lens systems so as to adjust and correct an optical-path length of the other lens system to the optical-path length of photometric light obtained by the prism of the one lens system.

DESCRIPTION OF THE PREFERRED EMBODIMENTS

Referring now to FIG. 1 through FIG. 11, a description will be given of a photometric system structure according to an embodiment of the present invention which is applied to a printer section of a printer processor 10.

Figure 1:
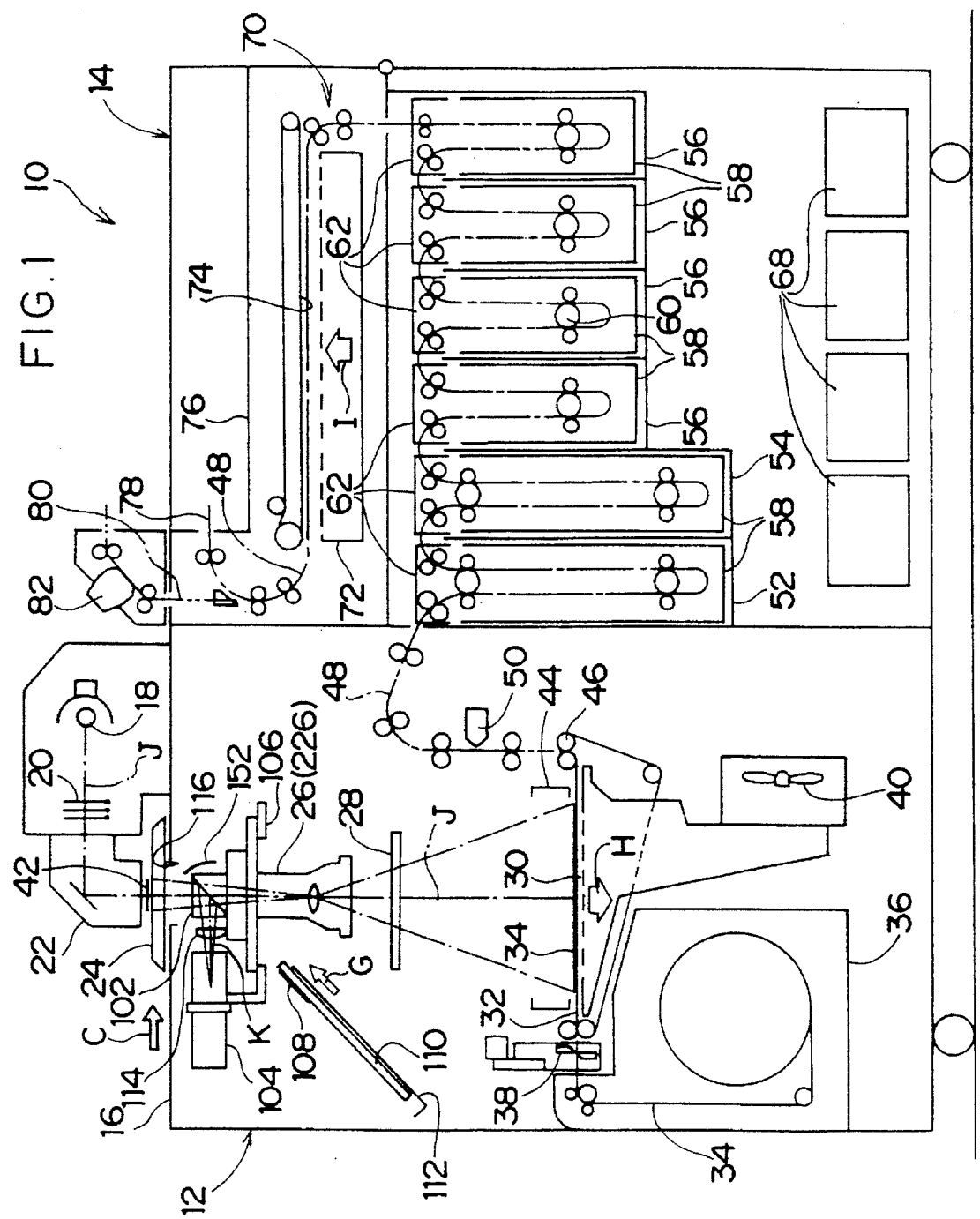
FIG. 1 is a schematic view of a printer processor to which a photometric system structure according to an embodiment of the present invention is applied.

As shown in FIG. 1, a printer processor 10 is equipped with a printer section 12 and a processor section 14, which are respectively illustrated at left and right sides of the paper of FIG. 1. In the printer section 12, a light source 18 is provided on an upper surface and outside of a casing 16 of the printer processor 10. Light (exposure light for printing) whose optical axis is disposed horizontally is emitted from the light source 18. The emitted light whose optical axis J (i.e., an optical axis for exposure light) is disposed horizontally passes through a CC filter 20 formed from three filters of C(cyan), M(magenta) and Y(yellow), and is diffused and refracted within a diffusion barrel 22. Thereafter, the direction of the light is changed substantially 90 degrees such that the light is irradiated downward. A negative carrier 24 which is a film carrier is mounted on the optical axis directed vertically and on an upper surface of the casing 16. A lens system 26, a shutter 28 and a printing table 30 are arranged within the casing 16 in that order from the upper side.

An upper surface of the printing table 30 is disposed horizontally, and a conveying belt 32 is provided along the upper surface of the printing table 30 in such a manner as to be driven to move in a left-to-right direction of the paper of FIG. 1. A paper magazine 36, in which a photographic printing paper 34 serving as a photosensitive material is wound and accommodated, is provided at a left-end lower side of the printing table 30. The photographic printing paper 34 after being delivered out of the paper magazine 36 is cut by a cutter 38 to a predetermined length, and is conveyed to a predetermined position on the printing table 30 so as to be carried by the conveying belt 32. A large number of opening holes are formed on the upper surface of the printing table 30 and on the conveying belt 32 moving therealong. The opening holes of the upper surface of the printing table 30 respectively communicate with the opening holes of the conveying belt 32. When the interior of the printing table 30 is held under negative pressure by a suction fan 40 (the direction in which the air inside the printing table 30 is sucked by the suction fan 40 is indicated by arrow H), the photographic printing paper 34 can be sucked onto and held by the printing table 30 on a predetermined position of the printing table 30 via the conveying belt 32.

A negative film 42 which is a photographic film is loaded in the negative carrier 24 and an image of the negative film 42 can be printed onto the photographic printing paper 34 sucked onto and held by the printing table 30.

An easel device 44 is provided above the printing table 30 and can cover peripheral edges of the photographic printing paper 34 when an image with borders is printed onto the photographic printing paper 34.

After completion of a printing operation, the photographic printing paper 34 is conveyed by the conveying belt 32 while being sucked onto and held by the printing table 30. Further, after the photographic printing paper 34 passes between a pair of rollers 46 located in a vicinity of the right side end of the printing table 30 at which the conveying belt 32 terminates, the direction of the photographic printing paper 34 changes from the horizontal direction to the vertical direction, and the photographic printing paper 34 is separated from the conveying belt 32 and then moves toward the processor section 14. In FIG. 1, a conveying path 48 of the photographic printing paper 34 is indicated by the one-dot chain line.

In the vicinity of and above the conveying path 48 extending from the printing table 30 to the processor section 14, a printing head 50 is provided so as to face the conveying path 48 and is used to print characters on the photographic printing paper 34 after printing.

In the processor section 14, a development tank 52, a bleaching/fixing tank 54 and four washing tanks 56 are sequentially arranged in that order from the side of the printer section 12. The development tank 52, the bleaching/fixing tank 54 and the four washing tanks 56 are filled with developing solution, bleaching/fixing solution and washing water, respectively. A processing rack 58 is provided within each of these tanks. The processing rack 58 is used to convey the photographic printing paper 34 in each processing solution in the form of the letter "U". Further, a cross-over rack 62 is provided at an upper portion of each processing rack 58. The cross-over rack 62 includes an external conveying portion for leading the photographic printing paper 34 into a processing tank or for leading the photographic printing paper 34 from a processing tank into the next processing tank.

The photographic printing paper 34 is subjected to development processing, bleaching and fixing processing and washing processing in the development tank 52, the bleaching/fixing tank 54, and the washing tanks 56, respectively.

The development tank 52, the bleaching/fixing tank 54 and the washing tanks 56 correspond to and communicate with replenishing tanks 68, respectively. The replenishing tanks 68 are used to replenish development solution, bleaching/fixing solution, and washing water, respectively, to the respective processing tanks.

After completion of each processing, the photographic printing paper 34 is conveyed to a drying section 70 disposed at an upper portion of the processor section 14. In the drying section 70, the photographic printing paper 34 is exposed to hot air blown from a chamber 72 from a lower side (the direction in which the hot air is blown is indicated by arrow I) and is conveyed horizontally by a net-shaped belt 74 while being pressed against a lower side of the net-shaped belt 74. Thus, the photographic printing paper 34 is dried while being conveyed by the net-shaped belt 74.

The photographic printing paper 34 which has been subjected to drying processing is turned back in the form of the letter "U" at a terminating end of the drying section 70 and is discharged to a stock portion 76 disposed outside. In the stock portion 76, the photographic printing paper 34 is accumulated in a state of being stacked on other discharged photographic printing paper.

At the end of the drying section 70 on the side where transport of the photographic printing paper 34 ends, the conveying path 48 is connected with a branch path 80 which can be switched over to a main path 78 leading to the stock portion 75. The branch path 80 leads to a densitometer 82. When a photographic printing paper is used to measure the deterioration of the development solution, the photographic printing paper is led into the branch path 80 from the drying section 70 without being discharged to the stock portion 75 and is measured by the densitometer 82.

When the negative film 42 is a 35 mm film, a prism 102 (specifically, a beam splitter) which is a photometric device is provided at an upper side of the lens system 26 which serves as a first lens system. The prism 102 causes light from a light source (i.e., exposure light) passing through the negative film 42 to be transmitted downward and illuminated onto the lens system 26, and at the same time, causes the direction of a part of the exposure light to be changed so that this part of the exposure light is illuminated as photometric light toward the left of the paper of FIG. 1. An optical axis K of the photometric light is disposed substantially horizontally. Provided on the optical axis K is a sensor 104 with a CCD which serves as a light-receiving device. The sensor 104 receives the photometric light, and on the basis of the received photometric light, can measure the density or the like of the negative film 42, can correct color and density, and can select the printing condition.

The lens system 26 can be moved horizontally on a supporting table 106 and integrally with the prism 102 (i.e., in directions perpendicular to the surface of the paper on which FIG. 1 is illustrated). The lens system 26 can be removed from the optical axis J. When the lens system 26 is moved to the front side of the surface of the paper of FIG. 1 and is withdrawn from the optical axis of the exposure light, another lens system can be moved, while being carried by the supporting table 105, so as to be disposed on the optical axis J.

Figure 2:
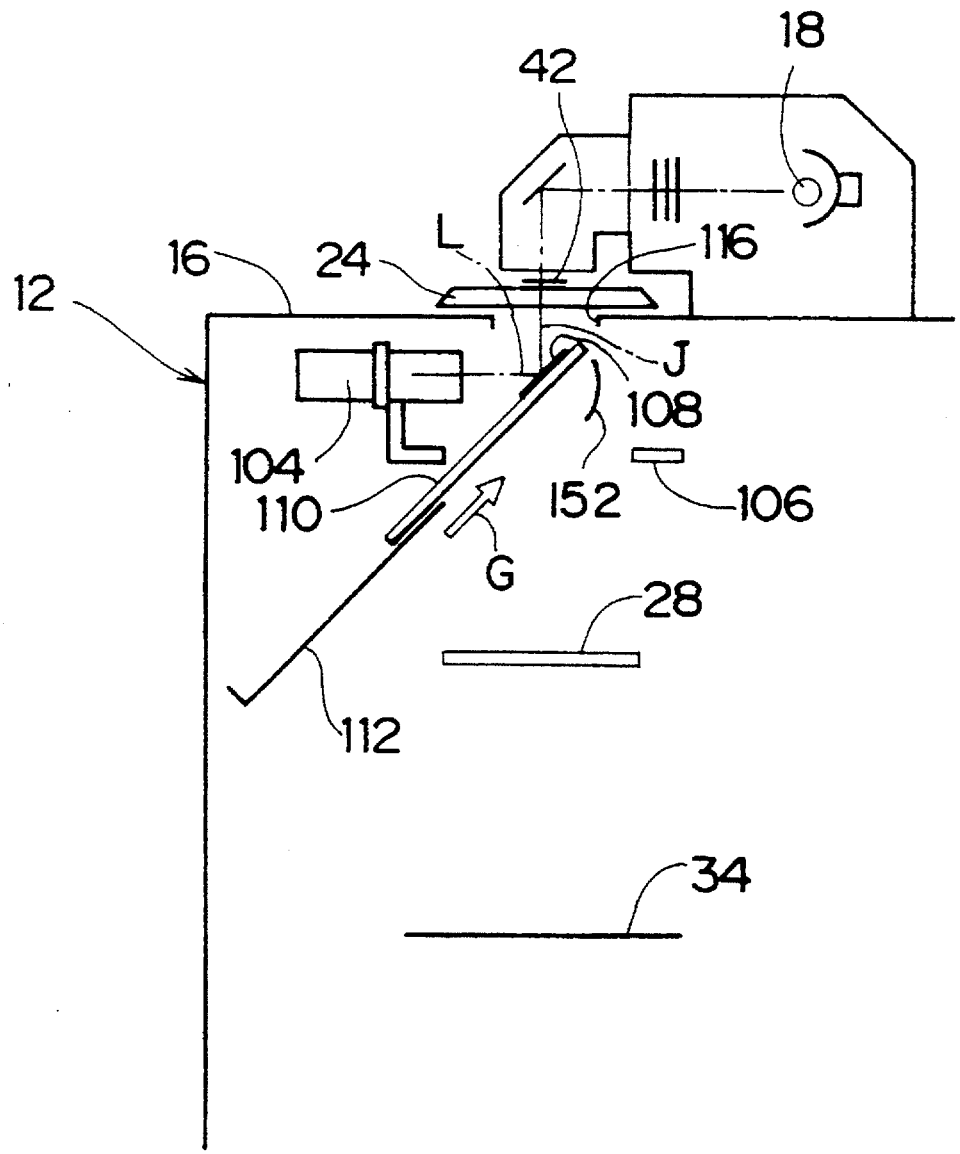
FIG. 2 is a diagram illustrating a state in which a mirror is used, which corresponds to a portion of FIG. 1.
Figure 3:
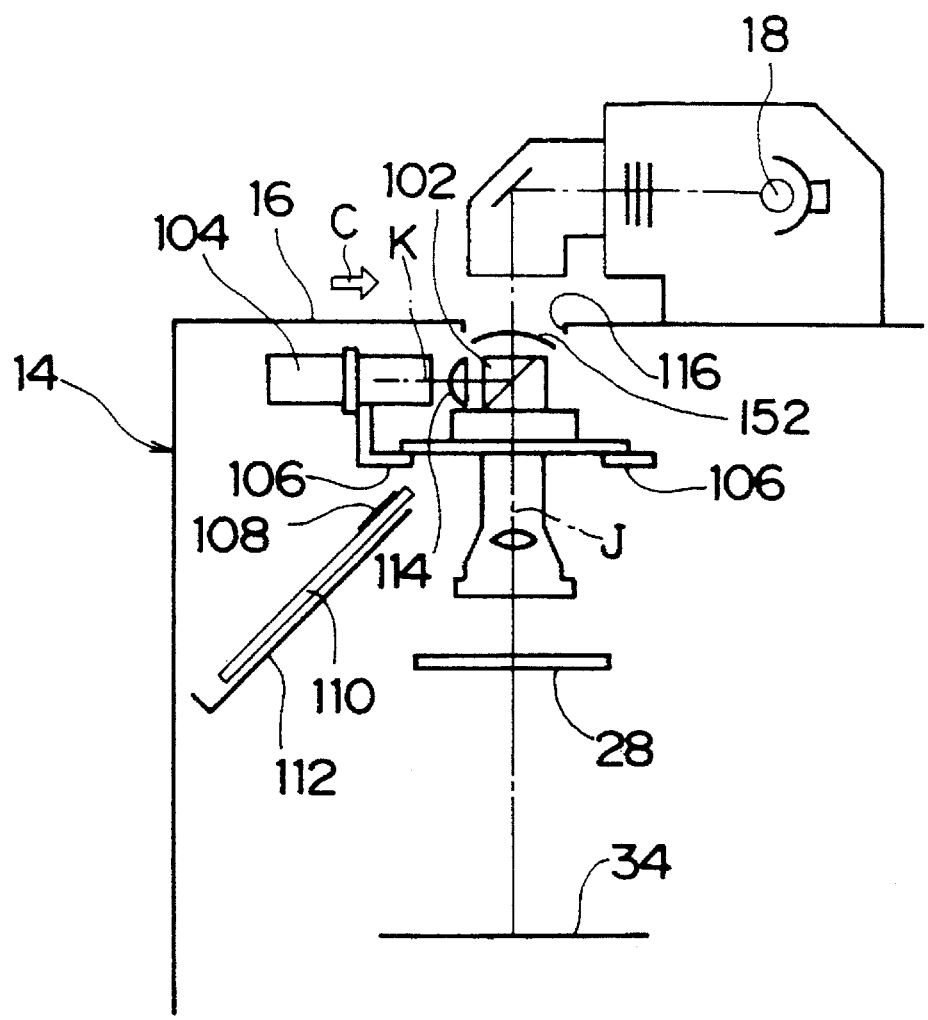
FIG. 3 is a diagram illustrating a state in which a lens and a prism are covered by a cover main body, which corresponds to a portion of FIG. 1.

When the negative film 42 is a Brownie film, a lens system 226 serving as a second lens system and corresponding to a Brownie film is mounted. Since the lens system 226 is of a large size, a photometric mirror (which will be hereinafter referred to as "mirror") 108 serving as a photometric device is used in place of the prism 102 to irradiate the photometric light. The mirror 108 is held at a leading end portion of a holding plate 110 serving as a holding member. When the mirror 108 is not being used, the holding plate 110 is stored in a storing plate 112 serving as a storing member. Thus, the mirror 108 is withdrawn from the optical axis J and does not interrupt the light. When the mirror 108 is used, as shown in FIG. 2, the mirror 108 is positioned on the optical axis J and between the negative film 42 and the photographic printing paper 34 by extending and moving the holding plate 110 from the storing plate 112 in a diagonally upward direction (the direction indicated by arrow G), so as to cause the exposure light passing through the negative film 42 to be reflected and used as photometric light without the exposure light being applied to the photographic printing paper 34. A reflecting surface of the mirror 108 is inclined with respect to the optical axis J. An optical axis L of the photometric light which is reflected by the mirror 108 is disposed coaxially with an optical axis K of the photometric light which is emitted from the prism 102. Further, the sensor 104 can receive either the photometric light obtained by the mirror 108 or that obtained by the prism 102. Before the holding plate 110 is extended, the lens system 26 must be withdrawn from the optical axis for exposure light. After selection of the printing condition, if the holding plate 110 is stored in the storing plate 112, another lens system 226 can be disposed on the optical axis J.

The light emitted from the prism 102 and the light reflected by the mirror 108 have different optical-path lengths. In order to correct the different optical-path lengths, a correction lens 114 is provided on the optical axis K as shown in FIG. 1. The correction lens 114 is mounted and fixed to the same base plate (not shown) as that of the prism 102 on the side where the photometric light is emitted from the prism 102, and can be moved together with the lens system 26. Thus, when the mirror 108 is used, the correction lens 114 is separated from the optical axis J.

Further, the negative carrier 24 is mounted in an opening 116 (i.e., a negative carrier-mounting portion which serves as a film carrier-mounting portion) formed in the casing 16 on the optical axis J. The negative carrier 24 is adapted to be slidable along a guide (not shown) on an upper surface of the casing 16. When the guide is moved from the left side to the right side of the paper of FIG. 1 (i.e., the direction indicated by arrow C), the negative carrier 24 is brought into a state of being positioned to cover the opening 116 (see FIG. 1). On the other hand, when the negative carrier 24 is moved from the right side to the left side of FIG. 1 (i.e., the direction opposite to that of arrow C), the negative carrier 24 can be withdrawn from the opening 116 (see FIG. 3).

Mounting and removing the negative carrier 24 are effected, for example, in a case in which the direction at which the negative carrier 24 is mounted with respect to the opening 116 is changed by an angle of 90° to properly select, as a position of a leading end of the negative film 42, a longitudinal direction of the printer section 12 or a transverse direction thereof to print the negative film 42 onto the photographic printing paper 34, or in a case in which another negative carrier 24 corresponding to a different size of negative film is mounted.

Figure 4:
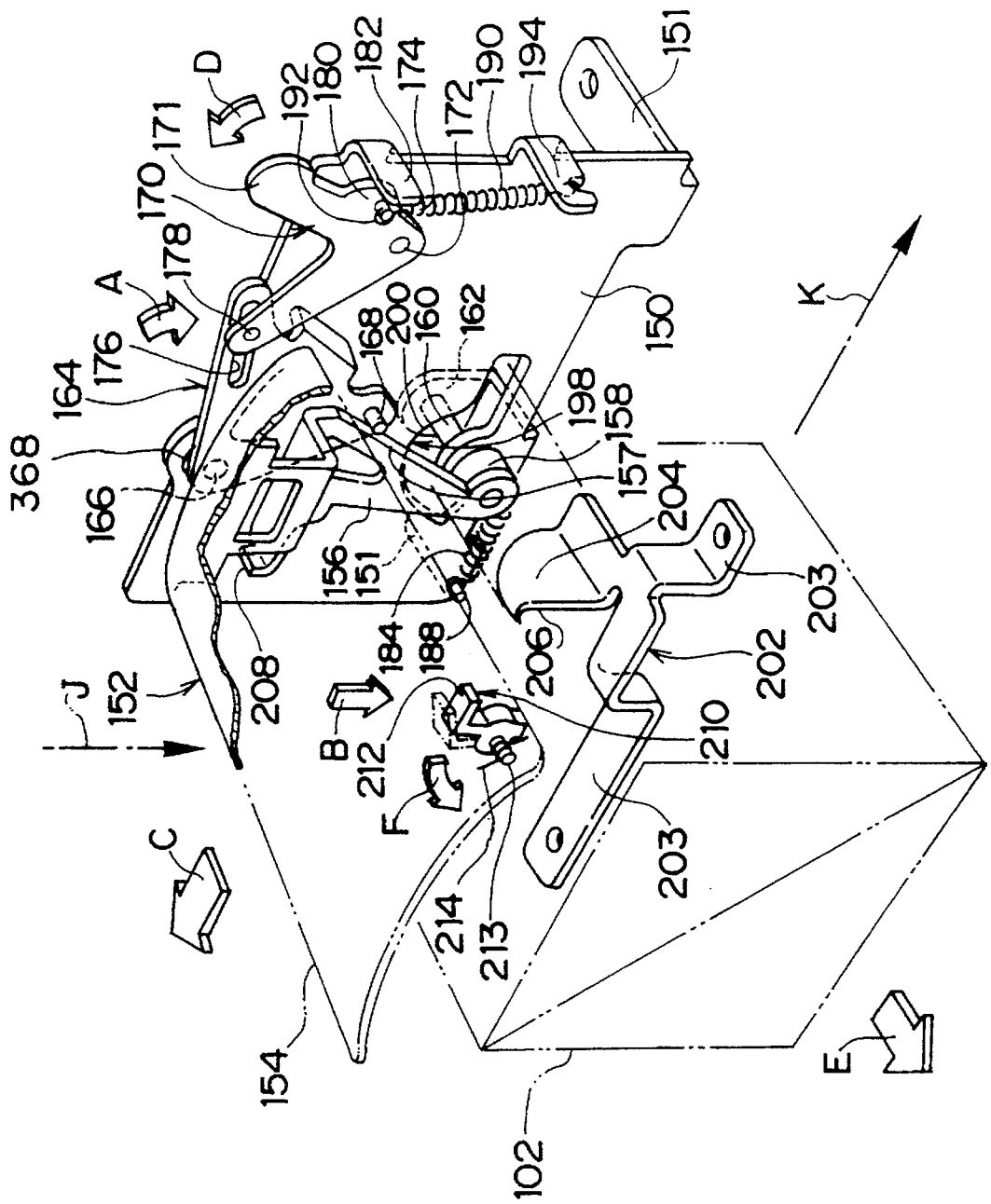
FIG. 4 is a perspective view of a lens system cover as seen from a reverse side of the paper of FIG. 1.

As shown in FIG. 4, a bracket 150 formed into a rectangular plate is provided upright within the casing 16 and near an edge of the opening 116. The bracket 150 is provided with a cover 152 which serves as a lens-system cover so as to cover the opening 116 side of the lens system. The cover 152 includes a cover plate 154 sufficient to shut out the light incident on the prism 102, and an arm piece 156 extending from one end portion of the cover plate 154. An extended leading end portion of the arm piece 156 is supported at a lower end portion of the bracket 150 by a shaft pin 160 via a spacer 158. An axial direction of the shaft pin 160 is disposed along a horizontal direction (i.e., the direction from the front side of the surface of the paper of FIG. 1 to the rear side thereof), and the cover 152 is rotatable around the shaft pin 160. When the cover 152 rotates, it is disposed at a position on the optical axis J where the cover plate 154 covers the opening 116 side of the prism 102 (i.e., the position shown in FIG. 5), or at a position where the cover plate 154 is withdrawn from the optical axis J (i.e., the position shown in FIG. 6). It should be noted that a mounting piece 151 is formed at both lower edges of the bracket 150 in a bent state so as to mount the bracket 150 to the casing 16.

The shaft pin 160 passes through the bracket 150 and projects toward a side opposite to that where the arm piece 156 is provided. The projected leading end of the shaft pin 160 passes through a bent piece 162 formed by a lower edge of the bracket 150 being bent into a substantially U-shaped configuration. Thus, the shaft pin 160 is supported at the two axial-direction ends thereof.

It should be noted that, in FIGS. 4 through 7, each of the optical axes J, K and L is illustrated with the leading end of the arrow being the direction in which light advances.

Next, operation of the cover 152 will be described.

The bracket 150 is provided with an operating piece 164. The operating piece 164 is formed as a fan-shaped plate. A pivot portion of the operating piece 164 is supported at an upper end portion of the bracket 150 via a spacer 368 by a shaft pin 166 substantially parallel to the above-described shaft pin 160, so that the operating piece 164 is rotatable around the shaft pin 166. An operating pin 168 is formed so as to project from one end portion of the operating piece 164 in a direction in which the operating piece 164 rotates, and abuts against an edge portion 157 of the arm piece 156 in a direction in which the arm piece 156 rotates. When the operating piece 164 rotates in the direction indicated by arrow A, the operating pin 168 presses the edge portion 157 so as to rotate the cover 152 in the direction indicated by arrow B in FIG. 5.

The bracket 150 is also provided with a lever 170. The lever 170 is formed so as to be bent in a substantially L-shaped configuration. The bent portion of the lever 170 is supported at an upper end portion of the bracket 150 via a spacer 174 by a shaft pin 172 substantially parallel to the above-described shaft pin 160, so that the lever 170 is rotatable around the shaft pin 172. When a leading end 171 of one end portion of the lever 170 is pressed by the negative carrier 24 in the direction indicated by arrow C (i.e., the direction in which the negative carrier 24 is mounted), the lever 170 rotates in the direction indicated by arrow D. An oblong hole 176 is formed at the other end portion of the above-described operating piece 164 in the direction in which the operating piece 164 rotates, and an engaging pin 178 fitted into the oblong hole 176 is provided so as to project from the other end portion of the lever 170. Thus, when the lever 170 rotates in the direction indicated by arrow D, the engaging pin 178 slidably moves within the oblong hole 176 along a longitudinal direction thereof to rotate the operating piece 164 in the direction indicated by arrow A.

A protruding portion 180 is formed at the lever 170 between a position where the shaft pin 172 is mounted and the leading end portion 171. Further, a stopper piece 182 is bent from the bracket 150 so as to correspond to an edge of the protruding portion 180. When the stopper piece 182 abuts against the edge of the protruding portion 180, rotation of the lever 170 in the direction opposite to that of arrow D is prevented. When rotation of the lever 170 in the direction opposite to that of arrow D is prevented, rotation of the operating piece 164 in the direction opposite to that of arrow A is also prevented. As a result, the arm piece 156 abuts against the operating pin 168 so as to prevent the cover 152 from rotating in the direction opposite to that of arrow B in FIG. 5. When rotation of the lever 170 is prevented with the stopper piece 182 abutting against the lever 170 and rotation of the cover 152 is prevented with the operating pin 168 abutting against the cover 152, the cover 152 is positioned on the optical axis J (i.e., the position shown in FIGS. 4 and 5).

A coil spring 184 is interposed between the arm piece 156 of the cover 152 and the bracket 150. One end portion of the coil spring 184 is engaged with a fastening screw 186 (see FIG. 5) screwed in an edge of the extended leading end portion of the arm piece 156 where the shaft pin 160 is mounted. Another end portion of the coil spring 184 is engaged with a fastening screw 188 screwed in the bracket 150 at a lower-side corner thereof. Urging force of the coil spring 184 causes the cover 152 to rotate in the direction opposite to that of arrow B so that the arm piece 156 abuts against the operating pin 168. Further, a coil spring 190 is interposed between the lever 170 and the bracket 150. One end portion of the coil spring 190 is engaged with a fastening screw 192 screwed in the protruding portion 180 of the lever 170, and another end portion of the coil spring 190 is engaged with a fastening piece 194 formed so as to be bent from a side edge of the bracket 150. Urging force of the coil spring 190 causes the lever 170 to be rotated and urged in the direction opposite to that of arrow D so that the protruding portion 180 abuts against the stopper piece 182.

Figure 5:
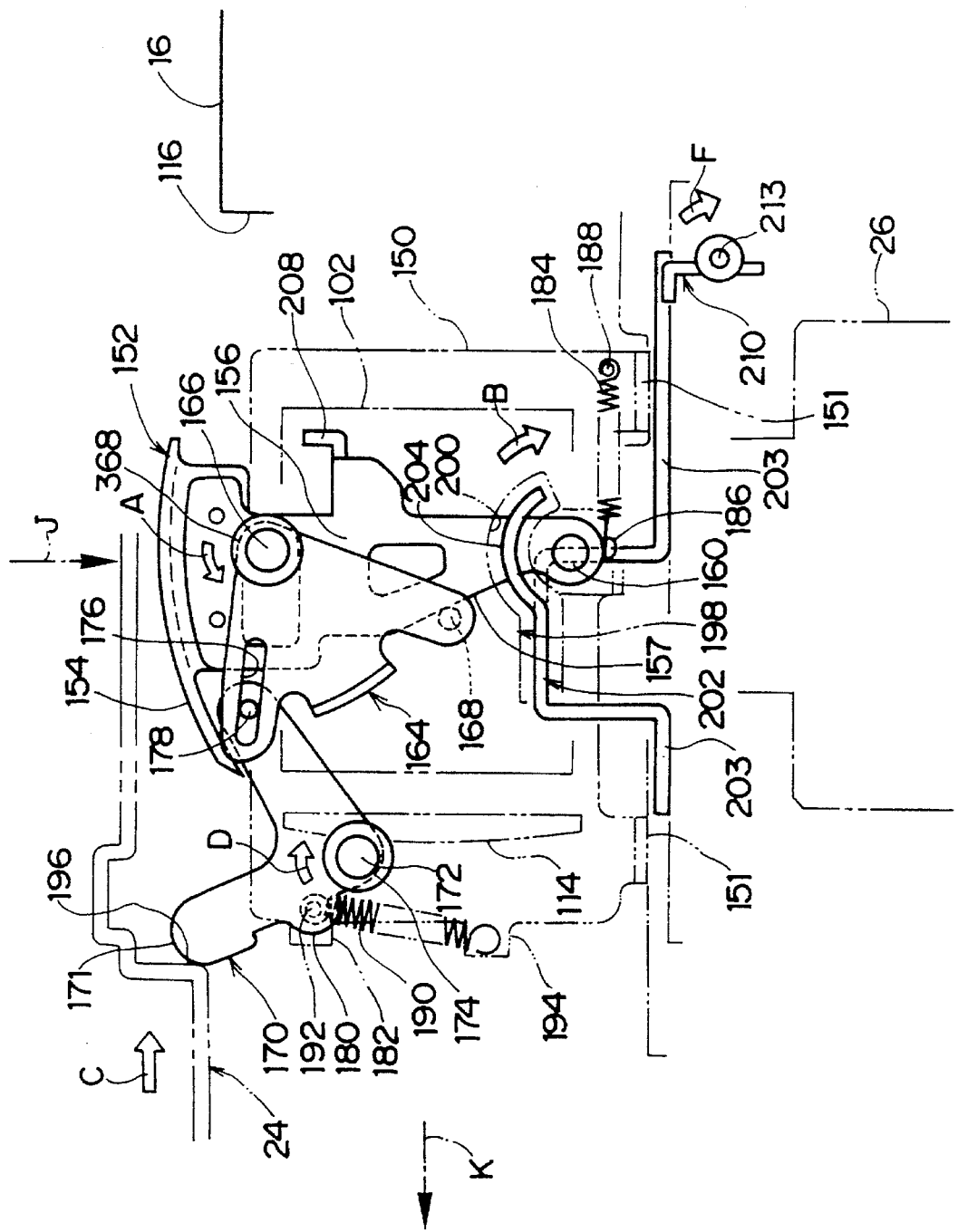
FIG. 5 is a diagram illustrating the lens system cover in a state in which the cover main body is positioned on an optical axis of exposure light as seen from an obverse side of the paper of FIG. 1.
Figure 6:
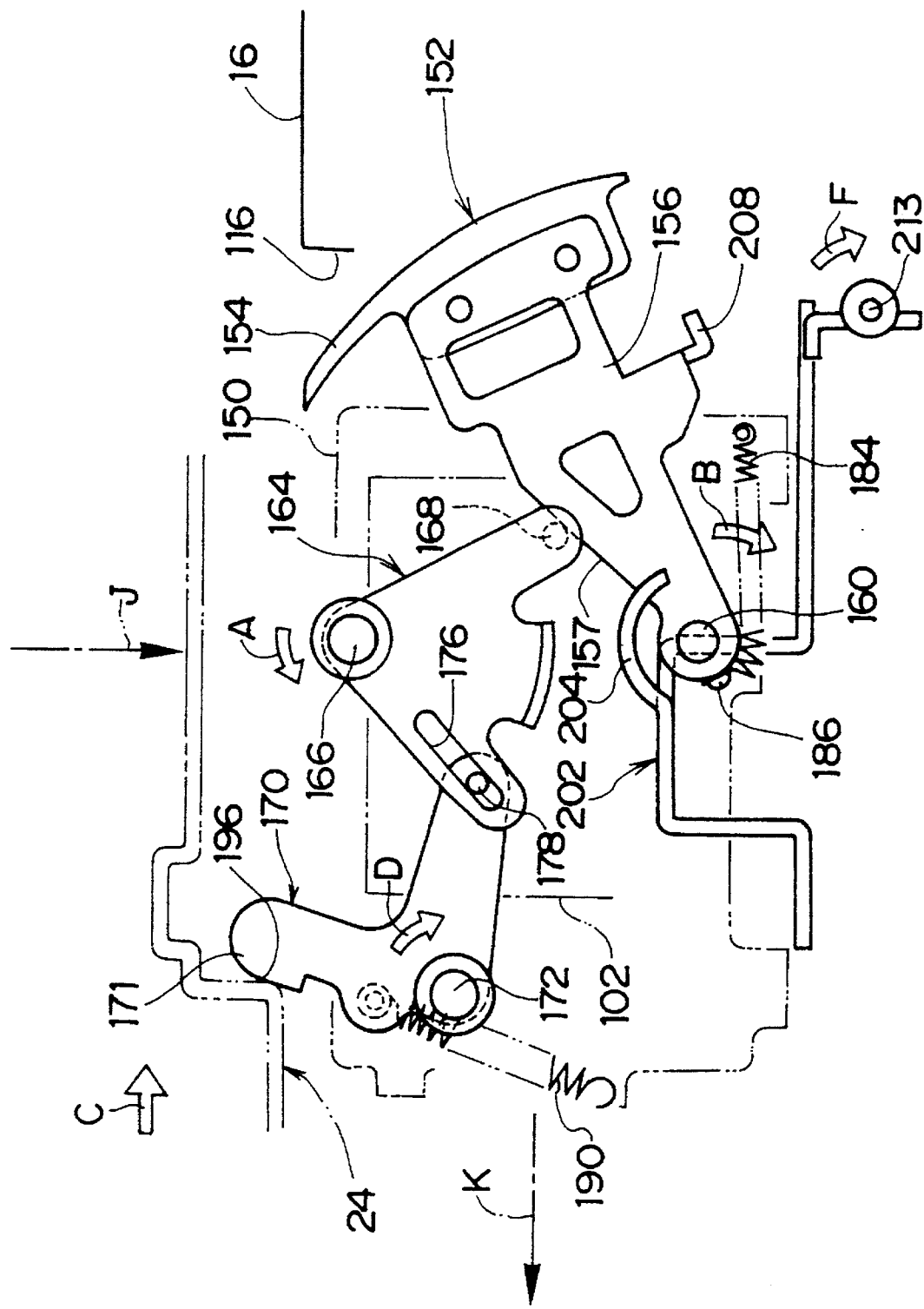
FIG. 6 is a diagram corresponding to FIG. 5 and illustrating a state in which the cover main body retreats from the optical axis of exposure light with a negative carrier being mounted.

As shown in FIG. 5, an operating portion 196 is formed at a bottom surface of the negative carrier 24 to correspond to the leading end portion 171 of one end of the lever 170. When the negative carrier 24 is moved in the direction indicated by arrow C so as to be mounted in the opening 116, the operating portion 196 rotates and presses the lever 170 in the direction indicated by arrow D against the rotating and urging force of the coil spring 190. As a result, the cover 152 rotates from a position on the optical axis of exposure light in the direction opposite to that of arrow B via the operating piece 164 against the rotating and urging force of the coil spring 184 and withdraws from the position on the optical axis (see FIG. 6). When the negative carrier 24 is in a state of being mounted in the opening 116, the operating portion 196 continues to press against the leading end portion 171 of one end of the lever 170 and the cover 152 is held at the position separated from the optical axis of exposure light.

When the negative carrier 24 is moved in the direction opposite to that of arrow C so as to be removed from the position where it is mounted, the lever 170 rotates in the direction opposite to that of arrow D by the rotating and urging force of the coil spring 190, and at the same time, the cover 152 rotates in the direction opposite to that of arrow B by the rotating and urging force of the coil spring 184 and is positioned on the optical axis of exposure light (i.e., the cover 152 returns to the state shown in FIGS. 4 and 5).

The bracket 150 has a through hole 198 including a circular-arc portion 200 which is formed in a circular-arc shape around the shaft pin 160. Further, an operating plate 202 is provided to be integrally movable with the lens system 26. The operating plate 202 includes a mounting piece 203 for allowing the operating plate 202 to move integrally with the lens system 26, and a curved portion 204 provided to correspond to the form of the circular-arc portion 200. The curved portion 204 also includes an operating edge 206 formed so as to move spirally and so as to correspond to the edge portion 157 in the direction in which the arm piece 156 of the cover main body 152 rotates. When the lens system 26 is positioned on the optical axis of exposure light, the curved portion 204 is inserted into the through hole 198 and the operating edge 206 does not abut against the edge portion 157 of the arm piece 156. As a result, the cover 152 can be operated in accordance with the mounting and removing operations of the negative carrier 24. When the lens system 26 is moved toward the rear side of the surface of the paper of FIG. 1 (i.e., in the direction indicated by arrow E in FIG. 4) so as to withdraw from the optical axis of the exposure light, the operating plate 202 also moves in the same direction. Thus, since the operating plate 202 moves in the direction indicated by arrow E and comes out of the through hole 198, the operating edge 206 abuts against the edge portion 157 of the arm piece 156. Thereafter, the operating edge 206 presses against the edge portion 157 and changes the position at which the operating edge 206 and the edge portion 157 of the arm piece 156 abut, and at the same time, presses against and rotates the cover main body 152 in the direction indicated by arrow B. An engaging piece 208 is formed at an intermediate portion of the arm piece 156 of the cover 152 in such a manner as to project from an edge portion in which the arm piece 156 rotates (i.e., an end portion of the arm piece 156 in the direction indicated by arrow B), which edge portion is disposed on the side opposite to the side at which the above-described edge portion 157 is disposed. An engaging stopper 210 formed in the casing 16 is provided on a locus of rotation of the engaging piece 208 resulting from rotation of the cover 152. The engaging stopper 210 is formed in an upside-down L-shaped configuration having a bent portion 212 (FIG. 4) at a leading end of the engaging stopper 210. Further, the engaging stopper 210 is supported by a shaft pin 213 parallel to the above-described shaft pin 160 so as to be rotatable around the shaft pin 213. The engaging stopper 210 is rotated and urged by a helical coil spring 214 (FIG. 4), which is engaged with an outer periphery of the shaft pin 213, so as to be set in a vertical state.

When the cover 152 rotates from the position on the optical axis J in the direction indicated by arrow B, the engaging piece 208 abuts against the bent portion 212 of the engaging stopper 210. Thereafter, the engaging piece 208 presses against the bent portion 212 and rotates the engaging stopper 210 in the direction indicated by arrow F against the rotating and urging force of the helical coil spring 204, so that the engaging stopper 210 is brought into an inclined state (the state in which the engaging stopper 210 is inclined is shown by the broken line in FIGS. 4 and 7). When the engaging piece 208 is moved to a lower side of the bent portion 212, the engaging stopper 210 rotates to its original position and the bent portion 212 is positioned on an upper side of the engaging piece 208. Thus, the cover 152 is prevented from rotating in the direction opposite to that of arrow B and is held at a position separated from the optical axis of exposure light.

At this time, the rotation angle of the cover 152 from the position on the optical axis of exposure light is substantially 90°, and is greater than a rotation angle in a state where the cover 152 is withdrawn from the optical axis of exposure light with the negative carrier 24 being mounted. For this reason, as shown in FIG. 7, when the holding plate 110 is extended from the storing plate 112 so that the mirror 108 is positioned on the optical axis J, the extended leading end portion of the holding plate 110 does not interfere with the cover 152.

Figure 7:
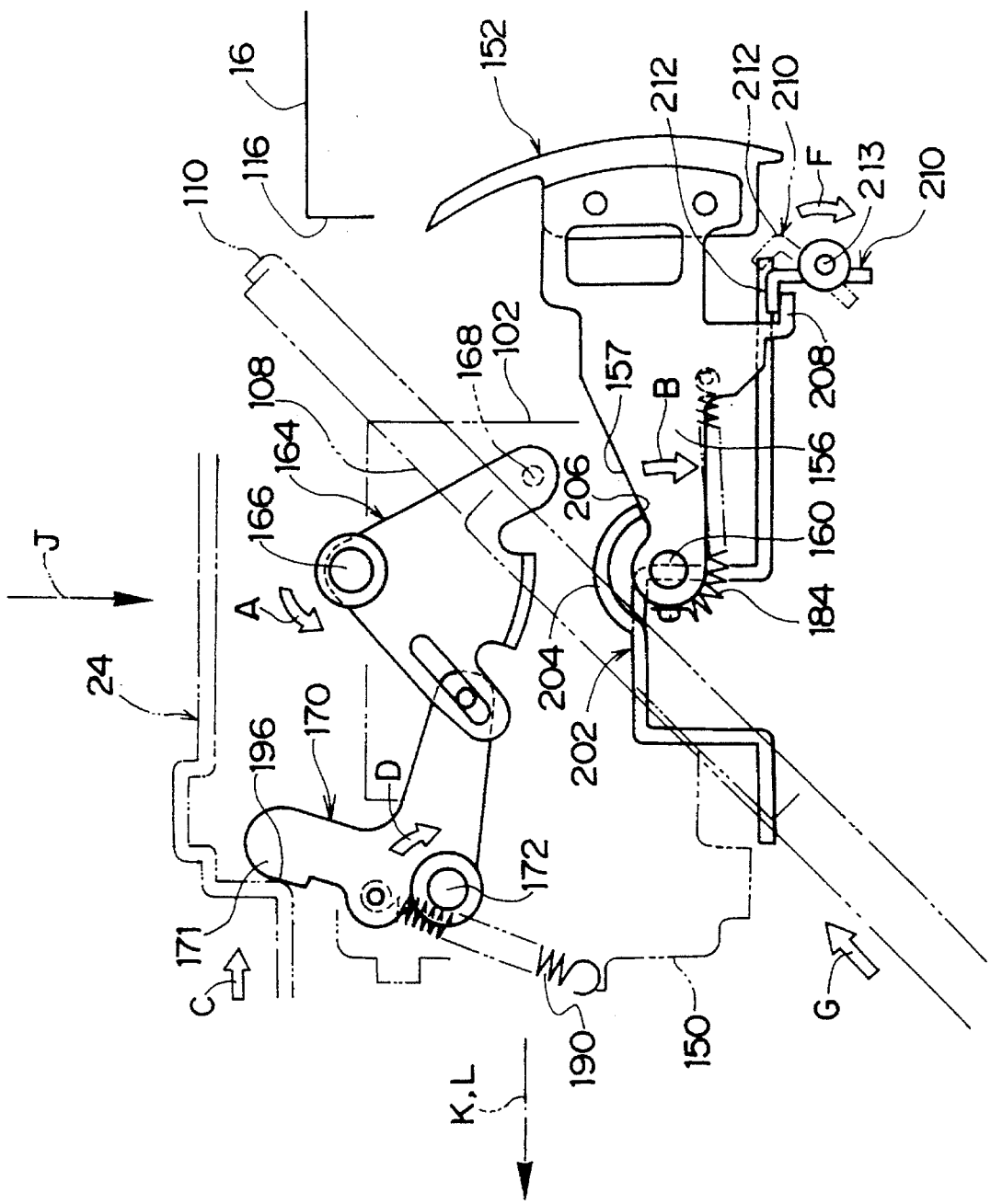
FIG. 7 is a diagram corresponding to FIG. 5 and illustrating a state in which the cover main body retreats from the optical axis of exposure light with a lens system being moved.

When the lens system 26 is moved in the direction indicated by arrow E (FIG. 4) in a state in which the negative carrier 24 is removed and the cover 152 is positioned away from the optical axis of exposure light (FIG. 6), the cover 152 is further pressed and rotated by the operating plate 202, which moves with the lens system 26 in the same direction, and can be moved to a position separated from the optical axis as shown in FIG. 7.

Since the cover 152 is operated in the above-described manner, even though the negative carrier 24 is removed from the opening 116, the prism 102 is not exposed at the opening 116. As a result, the prism does not become soiled by dust entering from the opening, which is caused by the prism being exposed at the opening, or become dirty or damaged by an operator's hand.

Further, when the lens system 26 is removed from the optical axis J and is replaced by another large-sized lens system which is larger than the above-described optical system, the prism cannot be disposed between the large-sized lens system and the negative carrier-mounting portion. For this reason, as shown in FIG. 7, it suffices that light is reflected as photometric light by using the mirror 108 and that the mirror 108 must not interfere with the cover 152.

The above-described cover 152 covers the opening 116 side of the prism 102. However, for the lens system covered by the cover 152, a lens system can be used in which a lens is provided on the side where light is made incident on the prism, and the lens is covered by the cover 152. Further, for the lens system formed such that the opening 116 side of the prism 102 is covered by the cover 152, in addition to the lens with a prism, various types of lens systems can be used. For example, in a lens system with no prism, the lens system faces the negative carrier-mounting portion and is exposed at the opening with no cover 152 when the negative carrier 24 is removed from a position where it is to be mounted. Even when a lens is provided on the side where light is made incident on the prism or even when a lens system with no prism is used, as well as in the case of the lens system with the prism, the downstream side of the optical path of the opening 116 is covered by the cover 152. Accordingly, even though the negative carrier 24 is removed from the opening 116, the lens is not exposed at the opening 116. As a result, the prism does not soil.

Next, a detailed description will be given of a mirror structure with reference to FIG. 8 through FIG. 11.

Figure 8:
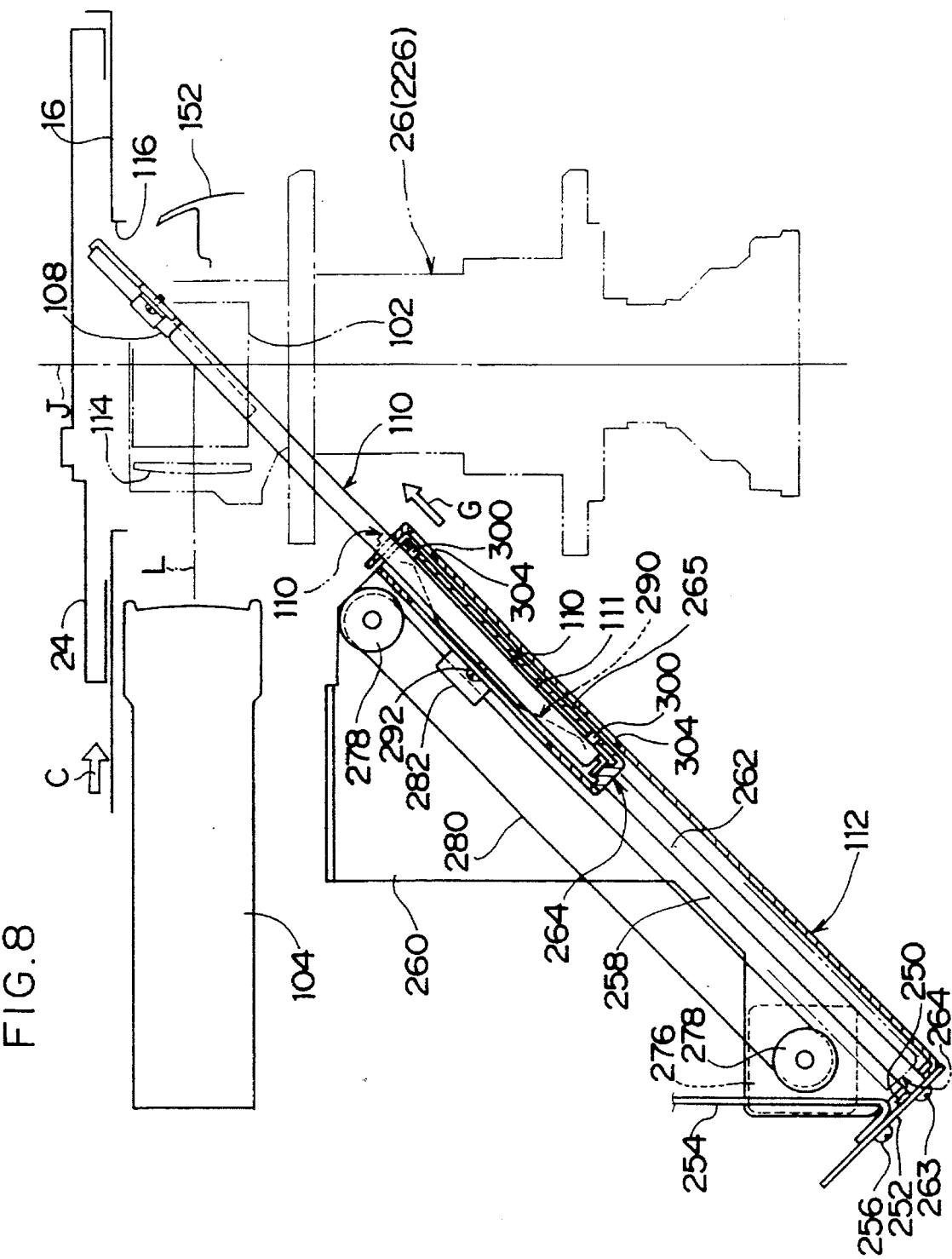
FIG. 8 is a side view of a mirror structure.
Figure 9:
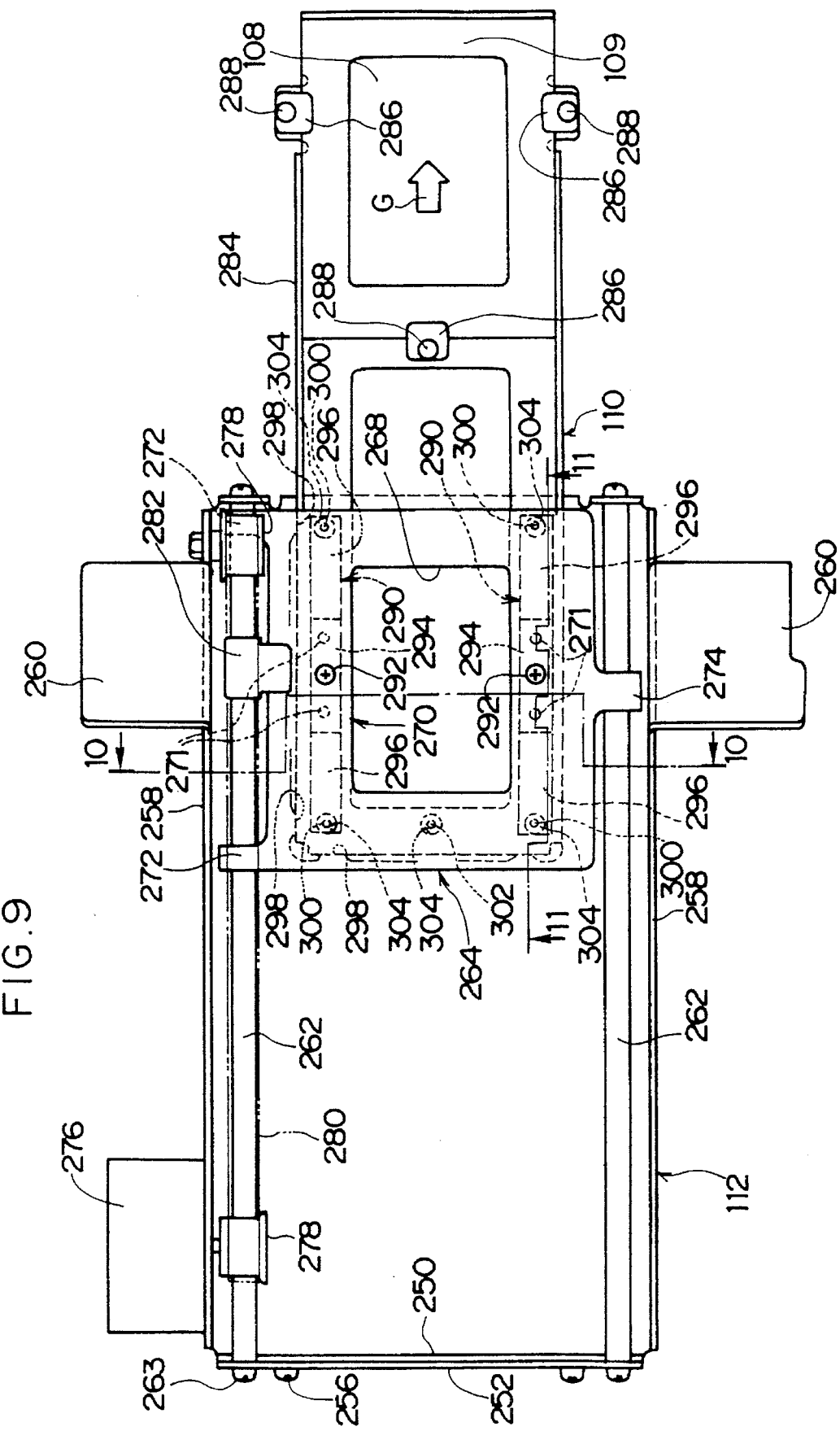
FIG. 9 is a plan view of the mirror structure.

As shown in FIG. 8, a storing plate 112 for storing the holding plate 110 which holds the mirror 108 is disposed in an inclined state in the same direction as that in which the holding plate 110 is extended (i.e., the direction indicated by arrow G). Further, as shown in FIG. 9, the storing plate 112 is formed in a rectangle-shaped configuration when seen from the side of the optical axis J of light incident on the lens system 26. A peripheral edge of the storing plate 112 bends substantially perpendicularly except for a central portion of an end portion of the storing plate 112 on the side where the holding plate 110 is extended, i.e., a portion used as a passage of the holding plate 110. An end plate 252 is fixed to a wall portion 250 disposed at an end portion of the storing plate 112 on the side where the storing plate 112 is stored, such that the end plate 252 is overlaid on the wall portion 250 in a thickness direction thereof. A mounting piece 254 is fastened to the end plate 252 by bolts 256. Further, both end portions of the storing plate 112 in a direction perpendicular to the direction in which the holding plate 110 moves (the direction of arrow G) are respectively bent in the same direction as that in which the wall portion 250 is provided uprightly, so as to form wall portions 258.

A mounting piece 260 is formed integrally with each wall portion 258. The storing plate 112 is mounted below the sensor and within the casing 16 by the mounting pieces 254, 260.

Figure 10:
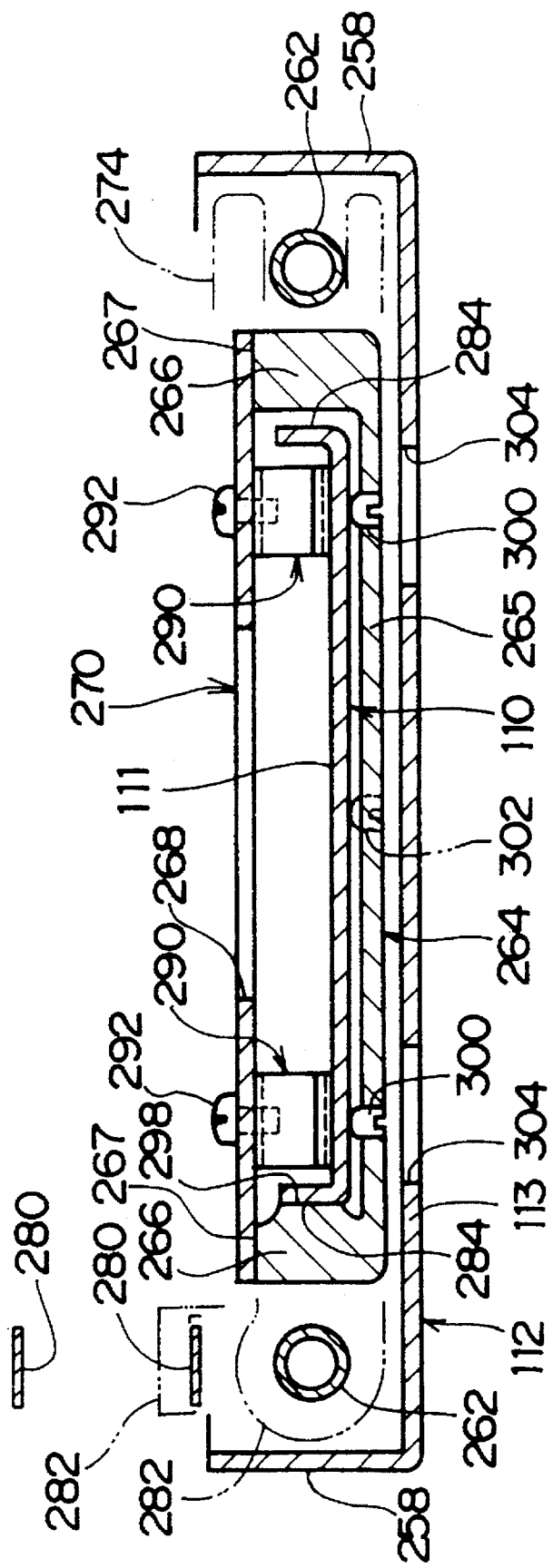
FIG. 10 is a cross-sectional view of the mirror structure taken along the line 10—10 of FIG. 9.

As shown in FIGS. 9 and 10, a guide pipe 262 whose axial direction is the same as the direction in which the holding plate is extended is provided in the vicinity of each end portion of the storing plate 112 in a transverse direction thereof, which is perpendicular to the direction in which the holding plate 110 is extended. The guide pipes 262 are fixed to the storing plate 112 by bolts 263. A rectangle-shaped moving plate (i.e., a moving member) 264 is provided between the two guide pipes 262 so as to be parallel to the storing plate 112. The moving plate 264 is provided with a wall portion 266 formed such that a peripheral edge of the moving plate 264, except for an end portion thereof in the direction in which the holding plate 110 is extended, bends substantially perpendicularly. A frame member 270 with a rectangular hole 268 at the center thereof is fixed to an upper end surface 267 of the wall portion of the moving plate 264. Further, the frame member 270 is provided with engaging portions 272, 274 which project toward the guide pipes 262 to engage with outer peripheries of the guide pipes 262. When the engaging portions 272, 274 cause the guide pipes 262 to slidably move, the moving plate 264 is movable on the storing plate 112 in the direction in which the holding plate is extended and in the direction in which the holding plate is stored.

A drive motor 276 is provided outside of one wall portion 258 of the storing plate 112 and near the wall portion 250. The drive motor 276 drives, along an axial direction of the guide pipes 262, a belt 280 which is trained around pulleys 278 respectively located at the end portions of the storing plate 112 on the sides where the holding plate 110 is extended and stored. The belt 280 and the moving plate 264 are connected to each other by a connecting member 282, and the belt 280 drives the moving plate 264 by moving along the axial direction of the guide pipes 262.

A base end portion of the holding plate 110 is accommodated within a space enclosed by the moving plate 264 and the frame member 270.

As shown in FIG. 9, the holding plate 110 is formed into a rectangular configuration constructed such that a side in a direction in which the holding plate 110 is extended is made longer, and is provided with wall portions 284 formed such that a peripheral edge of the holding plate 110 is bent substantially perpendicularly. Three mirror-pressing pieces 286 are provided at a leading end portion of the holding plate 110 on the side where the holding plate 110 is extended. A base end portion of each of the mirror-pressing pieces 286 is fixed to the holding plate by a bolt 288, and an edge portion 109 of the mirror 108 is caught by the holding plate 110 and respective leading ends of the mirror-pressing pieces 286. As a result, the mirror 108 is held at three points on the holding plate 110.

Figure 11:
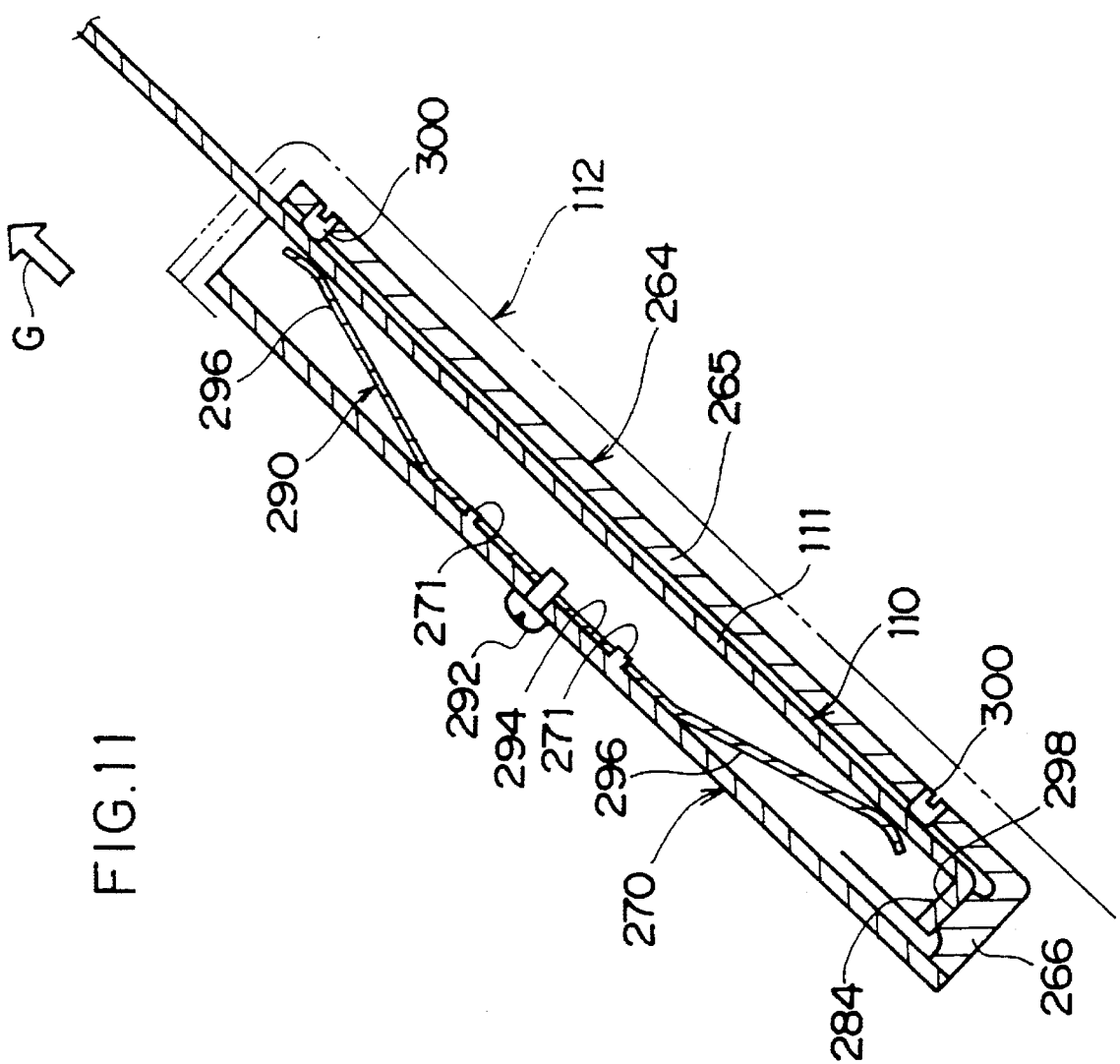
FIG. 11 is a cross-sectional view of the mirror structure taken along the line 11—11 of FIG. 9.

As shown in FIG. 11, plate springs 290 are provided between the frame member 270 mounted to the moving plate 264 and a bottom 111 of the holding plate 110. The plate springs 290 are disposed on each of the both sides of the holding plate 110, when seen from the direction in which the holding plate 110 is extended, and in the vicinity of side portions of the wall portions 284 in a transverse direction of the holding plate 110. The sides of the plate springs 290 disposed along the direction in which the holding plate 110 is extended are made longer. Respective central portions of the plate springs 290 in a longitudinal direction thereof are fixed to the frame member 270 of the moving plate 264 by bolts 292 to form fixing portions 294. Both end portions of the plate springs 290 in the longitudinal direction thereof are respectively bent such that obtuse angles are formed with respect to the fixing portions 294, and respectively form bent portions 296. The leading end of each bent portion 294 abuts and presses against the bottom 111 of the holding plate 110. Projections 271 are formed in the frame member 270 in such a manner as to be engaged with hole portions formed in the fixing portions 294 to position the plate springs 290.

Projections 298 are formed from a portion of the wall portion 266 which is disposed at an end portion of the moving plate 264 on the side where the holding plate is stored, and from a portion of the wall portion 266 which is disposed at one of the side portions of the moving plate 254 along a longitudinal direction thereof. The projections 298 project toward the wall portions 284 of the holding plate 110 which wall portion 284 faces these wall portions 266. Further, the projections 298 abut against the wall portion 284 of the holding plate 110 so as to prevent movement of the holding plate 110, with respect to the moving plate 264, in the direction in which the holding plate 110 is stored, and so as to prevent one of movement of the holding plate 110 in the direction in which the holding plate 110 is extended and movement thereof in the direction perpendicular to that in which the holding plate 110 is extended. Movement of the holding plate 110, with respect to the moving plate 264, in the direction in which the holding plate 110 is extended, and the other of movement of the holding plate 110 in the direction in which the holding plate 110 is extended and movement thereof in the direction perpendicular to that in which the holding plate 110 is extended are prevented by a pressing force applied between the moving plate 264 and the holding plate 110 by the plate springs 290.

Set screws 300 are screwed in from a surface of a bottom 265 of the moving plate 264 which faces the storing plate 112 at positions corresponding to respective end portions of the bent portions 296 of the plate springs 290. Leading end portions of the set screws 300 are adapted to abut against an external surface of the bottom 111 of the holding plate 110. When the amounts by which the set screws 300 are screwed in are increased, the holding plate 110 moves against the elastic force of the plate spring 290 in such a manner that the bottom 111 is separated from the bottom 265 of the moving plate 264. When the respective amounts by which the set screws 300 are screwed in are separately adjusted, the holding plate 110 can be moved and inclined so that its position is changed. For example, when the screw-in amounts of the set screws 300 disposed on the side where the holding plate 110 is stored are increased and the screw-in amounts of the set screws 300 disposed on the side where the holding plate 110 is extended are decreased, the holding plate 110 is inclined so as to be disposed in a nearly horizontal direction. On the other hand, if the screw-in amounts of the set screws 300 disposed on the side where the holding plate 110 is stored are decreased and the screw-in amounts of the set screws 300 disposed on the side where the holding plate 110 is extended are increased, the holding plate 110 is inclined so as to be disposed in a nearly vertical direction.

On the other hand, when amounts by which ones of two set screws 300, which are disposed along a direction perpendicular to the direction in which the holding plate is extended, are screwed in are increased, and amounts by which the others of the set screws 300 are screwed in are decreased, the holding plate 110 is inclined such that the side of the holding plate 110 where the other set screws 300 are provided is disposed at a lower position.

By changing the position of the holding plate 110, the angle, with respect to the optical axis J, of the mirror 108 disposed at a leading end portion of the holding plate 110 is adjusted so that photometric light reflected by the mirror 108 is transmitted to the sensor 104 in a proper direction. Namely, the direction of the optical axis L of the photometric light is adjusted.

In addition to the set screws 300 provided so as to correspond to the leading ends of the bent portions 296 of the plate springs 290, a set screw 302 is also provided at a longitudinal-directional central portion of the wall 266 of the moving plate 264 on the side where the holding plate 110 is stored. The position of the holding plate 110 can be changed by merely adjusting the set screw 302 and the two set screws 300 disposed on the side where the holding plate 110 is extended, without adjusting all of the set screws 300.

Further, when the holding plate 110 is extended and the mirror 108 is positioned on the optical axis J, operating holes 304 are formed in a bottom 113 of the storing plate 112 at positions which corresponds to the set screws 300, 302 such that the set screws 300, 302 can be respectively adjusted from a lower side.

Moreover, a pulse motor can be used as the drive motor 276. When the printing condition is selected on the basis of the photometric light, the drive motor 276 rotates normally and drives the moving plate 264 to move and extend the holding plate 110. Further, when the mirror 108 is positioned on the optical axis J, the holding plate 110 reaches a first position and can be controlled so as to be held at the first position by the driving force of the drive motor 276.

When an image is printed onto the photographic printing paper 34, the drive motor 276 rotates reversely to move and store the holding plate 110. When the mirror 108 is withdrawn from the optical axis J, the holding plate 110 reaches a second position and stops thereat.

The drive motor 276, the belt 280 and the moving plate 264 form a mirror moving device for moving the mirror 108 together with the holding plate 110.

As shown in FIG. 8, when the above-described negative carrier 24 is moved in a direction opposite to that of arrow C and is withdrawn from the opening 116 of the casing 16 in a case where the holding plate 110 is disposed at the first position, as the negative carrier 24 is withdrawn, the drive motor 276 is controlled so as to stop driving. Further, when the drive motor 276 stops, the holding plate 110 is released from being held at the first position and is adapted to be moved together with the moving plate 264 by their own weights in a direction in which the holding plate 110 is stored. In other words, a forced moving device for directly and forcibly moving the holding plate 110 to the second position as the negative carrier 24 is removed is provided.

It should be noted that, in order to move the holding plate 110 to the second position, the forced moving device may also be provided with an urging device formed from an elastic member such as spring to urge the holding plate 110 and the moving plate 264 in addition to their being moved by their own weights.

When the holding plate 110 is held at the first position, a separate device for holding the holding plate 110 at the first position may be provided in place of the driving force of the drive motor 276.

When the negative carrier 24 is installed again, the drive motor 276 rotates forwardly with the negative carrier 24 being mounted so as to move and extend the holding plate 110 to the first position.

In accordance with the above-described forced moving device, when the negative carrier 24 is removed from the opening 116 with the mirror 108 being positioned on the optical axis for printing without confirming whether the mirror 108 is positioned on the optical axis for printing, the mirror 108 is not exposed at the opening 116 because the cover 152 closes the opening 116. Thus, in the same way as the prism 102, the mirror does not become soiled by dust entering from the opening 116, or become dirty or damaged by an operator's hand.

Next, operation of the above-described embodiment will be described.

In accordance with the above-described structure, an image of the negative film 42 is printed onto the photographic printing paper 34 through the lens system 26. When the negative film 42 is a 35 mm film, the prism 102 provided integrally with the lens system 26 corresponding to a 35 mm film causes light passing through the negative film 42 to be transmitted through the prism 102 and illuminated to the lens system 26, and also causes a part of the light passing through the negative film 42 to be reflected as the photometric light and illuminated to the sensor 104.

When the sensor 104 receives the photometric light, the density of the negative film 42 is measured by the sensor 104. By the CC filter 20 effecting density correction and color compensation on the basis of the measured results, the printing condition can be selected. Thereafter, the shutter 28 opens for a predetermined time and printing operation for the photographic printing paper 34 is effected.

On the other hand, when another lens system 226 corresponding to a Brownie film is used, the mirror 108 causes the exposure light passing through the negative film 42 to be reflected toward the sensor 104.

The sensor 104 receives the photometric light in the same way as the prism 102, and the printing condition can be selected on the basis of the photometric light. Thereafter, the mirror 108 is withdrawn from the optical axis for printing and the lens system 226 corresponding to a Brownie film is mounted.

The optical axis K of the photometric light obtained by the prism 102 and the optical axis L of the photometric light obtained by the mirror 108 are disposed in the same direction. However, the optical-path length when the prism 102 is used and the optical-path length when the mirror 108 is used are different. Thus, the optical-path length of the photometric light when the mirror 108 is used is set as a normal optical-path length of the sensor 104, and the correction lens 114 corrects the optical-path length when the prism 102 is used. As a result, the same optical-path length can be obtained when using the prism 102 or when using the mirror 108.

The correction lens 114 is provided to be fixed on the same base plate as the prism 102 and can be mounted and removed together with the lens system 26. For this reason, it is not necessary to mount and remove the correction lens 114 separately from the lens system 26 nor is it necessary to move and adjust the correction lens 114.

Another lens system 226 which replaces the lens system 26 is not limited to lens systems in which a mirror is used to obtain photometric light, and a lens system using a prism may also be used. When these lens systems have different optical-path lengths resulting from different prisms being used, a correction lens is provided in each of the lens systems so that the optical-path length of each of the lens systems can be adjusted to an optical-path length which corresponds to a position where the sensor is disposed. Further, the optical-path length of photometric light obtained by a prism of one of the lens systems is set as the optical-path length which corresponds to a position where the sensor is disposed, and a correction lens is provided in the other of the lens systems so as to correct and adjust an optical-path length of the other lens system to the optical-path length of photometric light obtained by a prism of the one lens system.

The present invention is not limited to the above-described embodiment. For example, in the above-described embodiment, a description was given of the printer section 12 of the printer processor 10. However, the printer section may be separately provided without being limited to the above-described structure.

What is claimed is:

1. A photometric system structure used in a printer section in which an image of a photographic film is printed onto a photosensitive material through a lens system, the printer section having a structure in which the lens system can be removed from an optical axis of light emitted from a light source and can be replaced by another lens system, comprising:

a beam splitter associated with each lens system for changing a direction of an optical axis of at least a part of the light emitted from the light source, each beam splitter moving integrally with the associated lens system;

a photometric device for measuring the light whose optical axis direction has been changed and which is used as photometric light and an optical-path correction lens disposed on the optical axis of photometric light whose optical axis direction has been changed, the beam splitter associated with one of the lens systems is mounted on a same base as said optical-path correction lens so that the relative position therebetween is fixed, said optical-path correction lens adjusting and correcting, to a predetermined length, an optical-path length between the light source and a position at which the photometric light is measured.

2. A photometric system structure according to claim 1, wherein said photometric device comprises a light-receiving device provided on the optical axis of the photometric light, and said light-receiving device receives at least a part of the light emitted from the light source.

3. A photometric system structure according to claim 2, wherein said light-receiving device comprises a CCD.

4. A photometric system structure according to claim 1, further comprising:

a film carrier in which the photographic film is loaded, said film carrier being disposed on the optical axis of the light emitted from the light source and on an upstream side of an optical path with respect to said photometric device, and being disposed so as to be removable from the printer section;

a cover provided to be movable to a first position and a second position, said first position being on the optical axis of the light emitted from the light source and being a position between said photometric device and a position at which said film carrier is disposed, and said second position being a position at which the cover is withdrawn from the optical axis of the light emitted from the light source; and a moving device moving said cover to the second position when said film carrier is mounted on the printer section, and moving said cover to the first position when said film carrier is removed from the printer section.

5. A photometric system structure according to claim 4, wherein said moving device comprises a link member which can abut against said film carrier and said cover, and an urging member for urging said link member and said cover in a direction of the first position.

6. A photometric system structure according to claim 4, wherein said moving device comprises an operating plate, said operating plate moving said cover to the second position when the beam splitter is removed from the optical axis of the light emitted from the light source.

7. A photometric system structure used in a printer section in which an image of a photographic film is printed onto a photosensitive material through one of a first lens system or a second lens system, the printer section having a structure in which the each of the first lens system and the second lens system can be removed from an optical axis of light emitted from a light source and can be replaced by the other of the first lens system and the second lens system, comprising:

a prism which, when the first lens system is used, is provided to move integrally with the first lens system and is positioned on the optical axis of the light emitted from the light source to change a direction of an optical axis of at least a part of the light emitted from the light source;

an optical-path correction lens which, when the first lens system is used, is disposed on the optical axis of photometric light whose optical axis direction has been changed and is provided such that a positional relationship between said prism and said optical-path correction lens is fixed, said optical-path correction lens adjusting and correcting, to a predetermined length, an optical-path length between the light source and a position where the photometric light is measured;

a mirror which, when the second lens system is used, is disposed on the optical axis of the light emitted from the light source and between the photosensitive material and the photographic film, said mirror reflecting light transmitted through the photographic film to change an optical axis direction of the light; and a light-receiving device provided on an optical axis of the light whose optical axis direction has been changed, said light receiving device receiving the photometric light.

8. A photometric system structure according to claim 7, wherein said light-receiving device comprises a CCD.

9. A photometric system structure according to claim 7, further comprising:

a mirror holding member for holding said mirror.

10. A photometric system structure according to claim 9, further comprising:

a mirror moving device for moving said mirror so as to enable said mirror to be removed from the optical axis of the light emitted from the light source.

11. A photometric system structure according to claim 10, further comprising:

a mirror angle-of-tilt adjusting device for adjusting an angle of tilt of said mirror.

12. A photometric system structure according to claim 7, further comprising:

a film carrier in which the photographic film is loaded, said film carrier being disposed on the optical axis of the light emitted from the light source and on an upstream side of an optical path with respect to said prism and mirror, and being disposed so as to be removable from the printer section;

a cover provided to be movable to a first position and a second position, said first position being on the optical axis of the light emitted from the light source and being a position between said prism and mirror and a position at which said film carrier is disposed, and said second position being a position at which the cover is withdrawn from the optical axis of the light emitted from the light source; and a moving device moving said cover to the second position when said film carrier is mounted on the printer section, and moving said cover to the first position when said film carrier is removed from the printer section.

13. A photometric system structure according to claim 12, wherein said moving device includes a link member which can abut against said film carrier and said cover, and an urging member for urging said link member and said cover in a direction of the first position.

14. A photometric system structure according to claim 12, wherein said moving device has an operating plate, said operating plate moving said cover to the second position when the beam splitter is removed from the optical axis of the light emitted from the light source in a case in which the second lens system is used.

15. A photometric system structure used in a printer section in which an image of a photographic film is printed onto a photosensitive material through one of a first lens system or a second lens system, the printer section having a structure in which each of the first lens system and the second lens system can be removed from an optical axis of light emitted from a light source and can be replaced by the other of the first lens system and a second lens system, comprising:

a prism which, when the first lens system is used, is provided to move integrally with the first lens system and is positioned on the optical axis of the light emitted from the light source to change a direction of an optical axis of at least a part of the light emitted from the light source;

an optical-path correction lens which, when the first lens system is used, is disposed on the optical axis of photometric light whose optical axis direction has been changed and is provided such that a positional relationship between said prism and said optical-path correction lens is fixed, said optical-path correction lens adjusting and correcting, to a predetermined length, an optical-path length between the light source and a position where the photometric light is measured;

a mirror which, when the second lens system is used, is disposed on the optical axis of the light emitted from the light source and between the photosensitive material and the photographic film, said mirror reflecting light transmitted through the photographic film to change an optical axis direction of the light; and a light-receiving device provided on an optical axis of the light whose optical axis direction has been changed and receiving the photometric light, said light-receiving device comprising a CCD.

16. A photometric system structure according to claim 15, further comprising:

a mirror holding plate for holding said mirror.

17. A photometric system structure according to claim 16, further comprising:

a moving plate for moving said mirror holding plate to enable said mirror holding plate to be removed from the optical axis of the light emitted from the light source; and a driving device for driving said moving plate.

18. A photometric system structure according to claim 17, further comprising:

a plurality of screws for adjusting an angle of tilt of said mirror.

19. A photometric system structure according to claim 17, further comprising:

a guiding device for guiding said moving plate.

20. A photometric system structure according to claim 17, wherein said driving device has a motor and a belt for transmitting driving force from the motor to said moving plate.

21. A photometric structure for a photographic printer section in which an image of a photographic film is printed onto a photosensitive material by light from a light source, comprising:

a photometric device disposed in an optical path of light from the light source;

a film carrier in which the photographic film is loaded;

a cover moveable between a first position, which is on the optical axis of the light, and a second position that is withdrawn from the optical axis of the light; and means for moving the cover to the first position at all times when the film carrier is removed from the printer section and for moving the cover to the second position at all times when the film carrier is mounted on the printer section.

22. A photometric structure for a photographic printer section in which an image of a photographic film is printed onto a photosensitive material by light from a light source, comprising:

a photometric device disposed in an optical path of light from the light source;

a film carrier in which the photographic film is loaded;

a cover moveable between a first position, which is on the optical axis of the light, and a second position that is withdrawn from the optical axis of the light; and a moving device for moving the cover to the first position when the film carrier is removed from the printer section and for moving the cover to the second position when the film carrier is mounted on the printer section, said moving device comprising a link member which can abut against the film carrier and an urging member for urging said link member and said cover toward the first position.

23. A photometric structure for a photographic printer section in which an image of a photographic film is printed onto a photosensitive material by light from a light source, comprising:

a photometric device disposed in an optical path of light from the light source;

a beam splitter;

a film carrier in which the photographic film is loaded;

a cover moveable between a first position, which is on the optical axis of the light, and a second position that is withdrawn from the optical axis of the light; and a moving device for moving the cover to the first position when the film carrier is removed from the printer section and for moving the cover to the second position when the film carrier is mounted on the printer section, said moving device comprising an operating plate for moving said cover to the second position when said beam splitter is removed from the optical axis of the light.

* * * * *